(12) United States Patent
Fukui et al.

(10) Patent No.: US 8,091,953 B2
(45) Date of Patent: Jan. 10, 2012

(54) VEHICLE CEILING STRUCTURE

(75) Inventors: Kazuo Fukui, Aichi (JP); Nobuhide Hashimoto, Aichi (JP); Teruji Kuroyanagi, Aichi (JP); Kenji Atarashi, Aichi (JP); Hiroyuki Ishida, Aichi (JP); Jun Isami, Aichi (JP); Toshimitsu Matsuoka, Aichi (JP)

(73) Assignees: Toyota Shatai Kabushiki Kaisha, Kariya-shi (JP); Hayashi Telempu Co., Ltd., Nagoya-shi (JP); Toyota Boshoku Kabushiki Kaisha, Kariya shi (JP)

( * ) Notice: Subject to any disclaimer, the term of this patent is extended or adjusted under 35 U.S.C. 154(b) by 0 days.

(21) Appl. No.: 13/055,365

(22) PCT Filed: Mar. 18, 2009

(86) PCT No.: PCT/JP2009/055237
§ 371 (c)(1),
(2), (4) Date: Apr. 21, 2011

(87) PCT Pub. No.: WO2010/010734
PCT Pub. Date: Jan. 28, 2010

(65) Prior Publication Data
US 2011/0187158 A1 Aug. 4, 2011

(30) Foreign Application Priority Data
Jul. 21, 2008 (JP) ................. 2008-187990

(51) Int. Cl.
*B60R 13/02* (2006.01)
(52) U.S. Cl. .................. 296/187.05; 296/214

(58) Field of Classification Search ............. 296/187.05, 296/187.13, 193.12, 214
See application file for complete search history.

(56) References Cited

U.S. PATENT DOCUMENTS

| | | | | |
|---|---|---|---|---|
| 6,264,238 B1 * | 7/2001 | MacDonald et al. | ......... | 280/751 |
| 6,267,436 B1 * | 7/2001 | Takahara | ................. | 296/187.05 |
| 6,428,086 B2 * | 8/2002 | Takahara | ................. | 296/187.05 |

(Continued)

FOREIGN PATENT DOCUMENTS

JP          58 61039          4/1983

(Continued)

OTHER PUBLICATIONS

International Search Report issued Jun. 23, 2009 in PCT/JP09/55237 filed Mar. 18, 2009.

*Primary Examiner* — Jason S Morrow
(74) *Attorney, Agent, or Firm* — Oblon, Spivak, McClelland, Maier & Neustadt, L.L.P.

(57) ABSTRACT

In a vehicle ceiling structure, a long reinforcing rib is attached to a ceiling member of the vehicle, the rib being made of a resin having a different coefficient of thermal expansion from that of the ceiling member. The reinforcing rib comprises a plurality of segmented ribs that are divided by a gap in a longitudinal direction. One segmented rib of adjoining segmented ribs and is formed, in upper and lower parts of a front end portion thereof, with an upper protrusion and a lower protrusion protruding in the longitudinal direction. One segmented rib and the other segmented rib fit with each other such that a lower face of the upper protrusion and an upper face of the lower protrusion of the one segmented rib respectively face a rear end portion of the other segmented rib in an up and down direction.

5 Claims, 8 Drawing Sheets

U.S. PATENT DOCUMENTS

| | | | |
|---|---|---|---|
| 6,475,937 B1 * | 11/2002 | Preisler et al. | 442/370 |
| 6,652,021 B1 * | 11/2003 | Dykman et al. | 296/214 |
| 6,679,544 B1 * | 1/2004 | Hubbert et al. | 296/187.05 |
| 6,779,835 B2 * | 8/2004 | Fox et al. | 296/187.05 |
| 7,841,647 B2 * | 11/2010 | Niezur et al. | 296/187.05 |
| 2002/0145298 A1 * | 10/2002 | Williams et al. | 296/39.1 |
| 2005/0168015 A1 * | 8/2005 | Davey et al. | 296/214 |

FOREIGN PATENT DOCUMENTS

| | | |
|---|---|---|
| JP | 2003 320915 | 11/2003 |
| JP | 2006 1478 | 1/2006 |
| JP | 2006 206030 | 8/2006 |
| JP | 2006 306257 | 11/2006 |
| JP | 2007 145234 | 6/2007 |

* cited by examiner

VEHICLE CEILING STRUCTURE

TECHNICAL FIELD

The present invention relates to a vehicle ceiling structure having a reinforcing rib attached to a vehicle ceiling member.

BACKGROUND ART

Ceiling members for vehicles are provided with a reinforcing member for enhancing the rigidity of and thereby reinforcing the ceiling members. Such a reinforcing member may possess an impact absorbing function for absorbing an impact when a head portion of a passenger hits the ceiling member (see Patent Documents 1 to 3). As a reinforcing member, for example, a resin molded product having a resin lattice rib as a base is known. Such a reinforcing member (hereinafter referred to as a reinforcing rib) is secured to the ceiling member with an adhesive such as a hot melt adhesive.

Patent Document 1: Japanese Published Unexamined Patent Application No. 2003-320915
Patent Document 2: Japanese Published Unexamined Patent Application No. 2006-1478
Patent Document 3: Japanese Published Unexamined Patent Application No. 2007-145234

DISCLOSURE OF THE INVENTION

Problems to be Solved by the Invention

However, with a long reinforcing rib attached to the ceiling member, when the ceiling member and reinforcing rib undergo thermal expansion and contraction due to temperature changes thereof, there is a difference in the amount of expansion and contraction between them because they have different coefficients of thermal expansion. Generally, for the reinforcing rib, a material (such as resin) having a higher coefficient of thermal expansion than that of the ceiling member is used, because of which the amount of expansion and contraction of the reinforcing rib is larger than that of the ceiling member, which may result in formation of wrinkles in the ceiling member.

A long reinforcing rib may be divided into a plurality of pieces and attached with a gap between one another in the longitudinal direction, in which case the thermal expansion and contraction occur respectively in each of the segmented reinforcing rib pieces so that the difference in the amount of expansion and contraction between the ceiling member and reinforcing rib can be made smaller. On the other hand, the segmented portions of the reinforcing rib may be subjected to stress during handling when assembling the ceiling member to a vehicle body, which may cause flexing or bending of the ceiling member.

The present invention was devised in view of such conventional problems, aiming at providing a vehicle ceiling structure that can prevent occurrence of failures such as wrinkles, flexing, bending, and the like of the ceiling member.

Means for Solving the Problems

The present invention resides in a vehicle ceiling structure having a long reinforcing rib attached to a ceiling member of the vehicle, the rib being made of a resin having a different coefficient of thermal expansion from that of the ceiling member, wherein the reinforcing rib comprises a plurality of segmented ribs that are divided by a gap in a longitudinal direction;

one of the segmented ribs adjacent to each other is formed, in upper and lower parts of an end portion thereof, with an upper protrusion and a lower protrusion protruding in the longitudinal direction; and the one segmented rib and the other segmented rib fit with each other such that a lower face of the upper protrusion and an upper face of the lower protrusion of the one segmented rib respectively face an end portion of the other segmented rib in an up and down direction.

In the vehicle ceiling structure of the present invention, the reinforcing rib is not formed in one piece but comprises a plurality of segmented ribs divided by a gap in the longitudinal direction. Therefore, when the reinforcing rib and ceiling member undergo thermal expansion and contraction due to temperature changes thereof after the reinforcing rib is attached to the ceiling member, the difference in the amount of expansion and contraction caused by the difference in their respective coefficients of thermal expansion can be made smaller. Namely, since thermal expansion and contraction occur respectively in each of the plurality of segmented ribs that are divided of the reinforcing rib, the difference in the amount of expansion and contraction between the reinforcing rib and the ceiling member can be made smaller. Thereby, formation of wrinkles in the ceiling member after the attachment of the reinforcing rib can be prevented.

Moreover, in the present invention, the one segmented rib and the other segmented rib adjoining each other fit with each other such that a lower face of the upper protrusion and an upper face of the lower protrusion of the one segmented rib respectively face an end portion of the other segmented rib in the up and down direction. Namely, the one segmented rib has the lower face of the upper protrusion and the upper face of the lower protrusion at least in upper and lower parts of its end portion to act as abutting faces to the end portion of the other segmented rib, so that the end portion of the other segmented rib faces these abutting faces in the up and down direction.

Accordingly, the one segmented rib and the other segmented rib adjacent to each other fit with each other in a state in which the other segmented rib is restricted sufficiently relative to the one segmented rib in the up and down direction. Thereby, during the handling when assembling the ceiling member to the vehicle body after attaching the reinforcing rib to the ceiling member, even if the segmented ribs are subjected to stress in the portion between them (segmented portion), flexing or bending of the ceiling member can be prevented from occurring.

Accordingly, in the vehicle ceiling structure of the present invention, the problems associated with the difference in the coefficient of thermal expansion between the ceiling member and reinforcing rib can be prevented by forming the reinforcing rib with a plurality of segmented ribs. And, the problem that may occur by forming the reinforcing rib with a plurality of segmented ribs can be prevented by the fitting structure between adjacent segmented ribs.

As described above, according to the present invention, a vehicle ceiling structure that can prevent occurrence of failures such as wrinkles, flexing, bending or the like of the ceiling member can be provided.

BEST MODES FOR CARRYING OUT THE INVENTION

Figure 1:
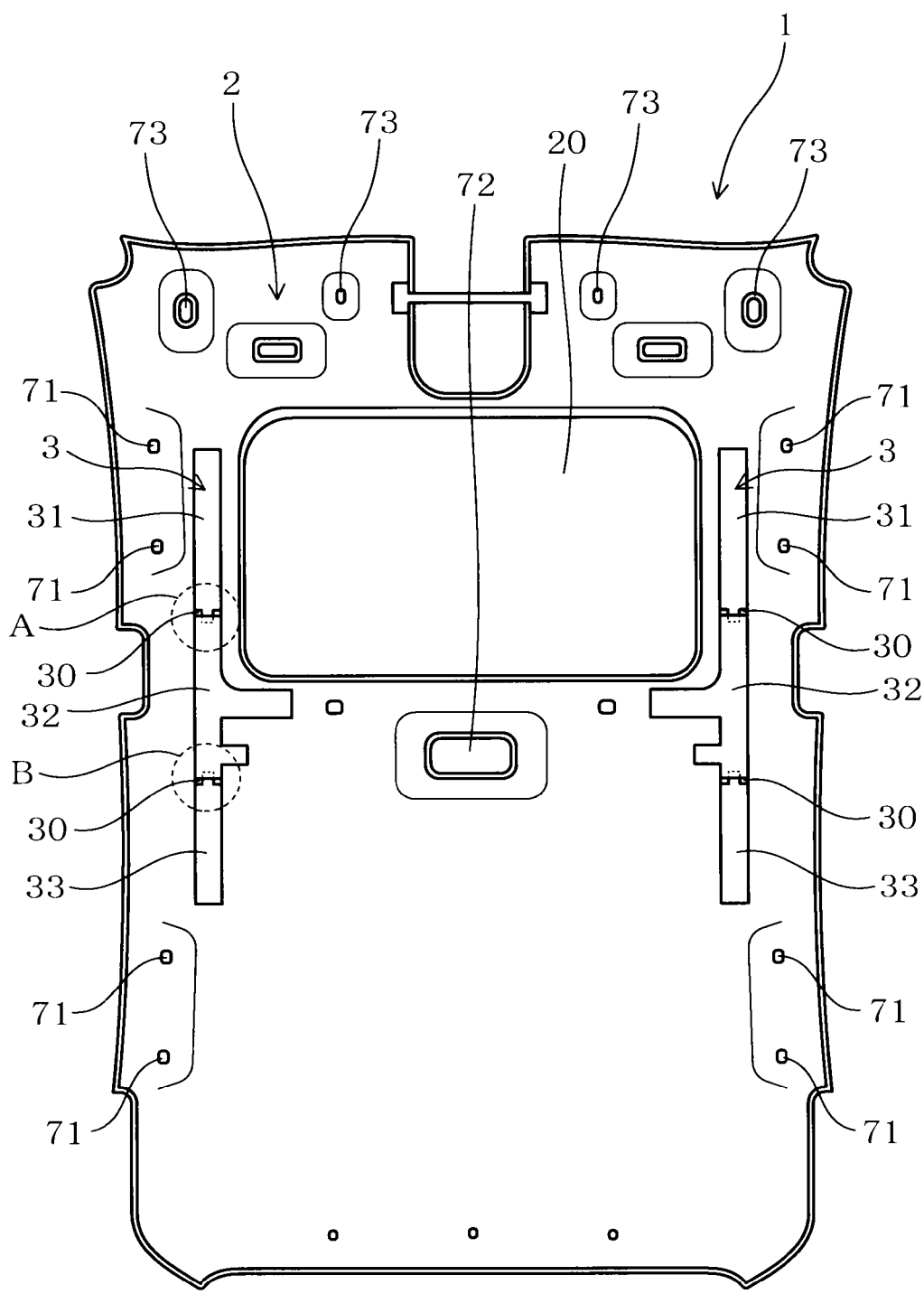
FIG. 1 is an explanatory diagram showing a ceiling member with reinforcing ribs attached thereto in one embodiment.

In the present invention, the one segmented rib and the other segmented rib adjacent to each other are preferably fitted with each other such that they are not twisted in a rotating direction around an axis extending in the longitudinal direction. Namely, the upper protrusion and lower protrusion of the one segmented rib, and the end portion of the other segmented rib, are preferably formed such that they can fit with each other without being twisted in a rotating direction around an axis extending in the longitudinal direction.

In this case, the one segmented rib and the other segmented rib adjacent to each other can be sufficiently and reliably fitted with each other.

Further, the upper protrusion and lower protrusion of the one segmented rib preferably have respective tips protruding in the longitudinal direction to positions different from each other.

In this case, the one segmented rib and the other segmented rib adjacent to each other can be readily fitted with each other.

Further, the lower protrusion of the one segmented rib preferably has its tip positioned to protrude more in the longitudinal direction than that of the upper protrusion.

In this case, the other segmented rib can be readily fitted with the one segmented rib secured to the ceiling member prior to the other. More specifically, the end portion of the other segmented rib can be readily fitted diagonally from above in between the upper protrusion and lower protrusion of the one segmented rib.

Further, the ceiling member preferably has an opening for a sunroof.

That is, the ceiling member provided with the opening for the sunroof has a lower rigidity than normal ceiling members. Therefore, attaching the reinforcing rib to the ceiling member by adopting the vehicle ceiling structure of the present invention enables to secure a sufficient rigidity of the ceiling member.

Further, the ceiling member and reinforcing rib are preferably bonded together with a hot melt adhesive.

In this case, the reinforcing rib can be readily and reliably attached to the ceiling member.

For the hot melt adhesive, polyamide, polyolefin, polyester, synthetic rubber hot melt adhesives and the like can be used.

Further, at least part of the reinforcing rib preferably serves also as an impact absorbing material.

In this case, at least part of the reinforcing rib not only serves its function as a reinforcing member for enhancing the rigidity of the ceiling member, but also serves a function as an impact absorbing material for absorbing an impact by deforming and/or breaking by an impact load applied when, for example, a head portion of a passenger inside the vehicle hits the ceiling member.

Further, at least one of the plurality of segmented ribs is preferably made of a different resin from that of other segmented ribs.

In this case, it is possible to use different types of resins depending on the attaching locations and necessary performance properties or the like of the segmented ribs to deal with various configurations. For example, a high-rigidity resin (e.g. ABS resin or the like) can be used for the segmented rib that is attached to a portion where the ceiling member is particularly desired to have enhanced rigidity, while a resin easily deformable and/or breakable for impact and having a relatively low rigidity (e.g. PP (polypropylene) resin or the like) can be used for the segmented rib that is attached to a portion where impact absorption is particularly necessary.

Using different resins for forming respective segmented ribs and bonding them using an adhesive such as a hot melt adhesive will necessitate changing adhesives respectively for the segmented ribs. However, by adopting the vehicle ceiling structure of the present invention, it is possible to use only one type of adhesive.

Namely, even if there is a segmented rib made of a resin that has somewhat lower compatibility with the adhesive used, other segmented ribs made of a resin having good compatibility with the adhesive used and arranged on both sides can provide an anchoring effect due to the fitting structure between the adjacent segmented ribs, whereby the reinforcing rib can be bonded to the ceiling member sufficiently. Thereby, a situation where two types of adhesives would have been required conventionally can be dealt with using only one type of adhesive.

For the material forming the ceiling member, a mixture or the like of a thermoplastic resin such as polypropylene, polyurethane, polyethylene terephthalate, and fiber such as wood fiber, glass fiber, can be used.

For the resin forming the reinforcing member, ABS, PP, Noryl (trademark), polycarbonate, polycarbonate ABS, PE and the like can be used.

EMBODIMENTS

The vehicle ceiling structure according to an embodiment of the present invention will be described with reference to FIGS. 1 to 8.

In this embodiment, the vehicle ceiling structure 1 is adopted in a vehicle equipped with a sunroof as shown in FIG. 1, but the present invention is not limited to this.

As shown in the drawing, the ceiling member 2, which is an interior material of the vehicle interior, is formed with a ceiling opening 20 for the sunroof. The ceiling opening 20 is provided on the front side of the ceiling member 2 and rectangular.

Long reinforcing ribs 3 are respectively attached in a front to back direction on both left and right sides of the ceiling opening 20 of the ceiling member 2. The reinforcing ribs 3 are bonded to the ceiling member 2 with a hot melt adhesive.

In this embodiment, the two reinforcing ribs 3 attached on both left and right sides of the ceiling opening 20 of the ceiling member 2 have the same configuration, except that they are provided symmetrically on the left and right. Accordingly, for convenience of explanation, one of the reinforcing ribs 3 attached on the left side of the ceiling opening 20 of the ceiling member 2 will be described.

As shown in FIG. 1, the reinforcing rib 3 is made up of a plurality of segmented ribs divided in a longitudinal direction thereof, i.e., a first segmented rib 31, a second segmented rib 32, and a third segmented rib 33 in order from the front side.

Figure 2:
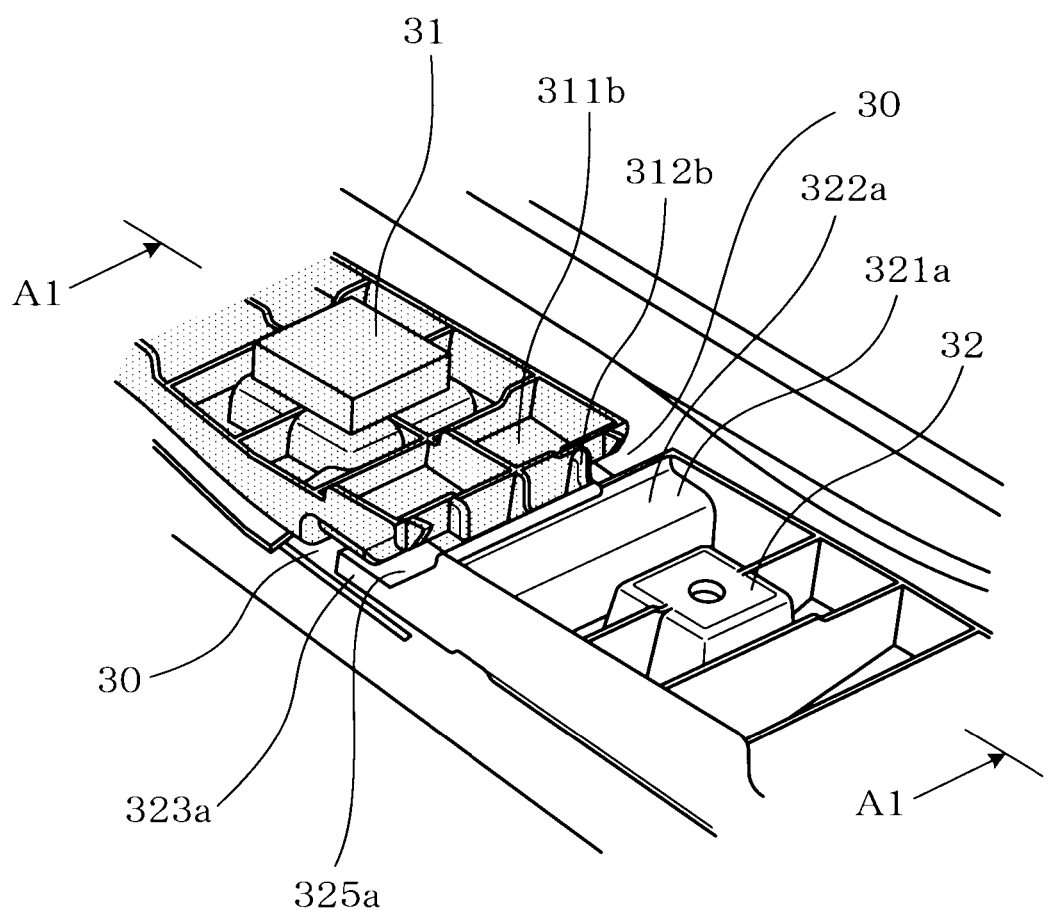
FIG. 2 is an enlarged perspective view of part A of FIG. 1.
Figure 3:
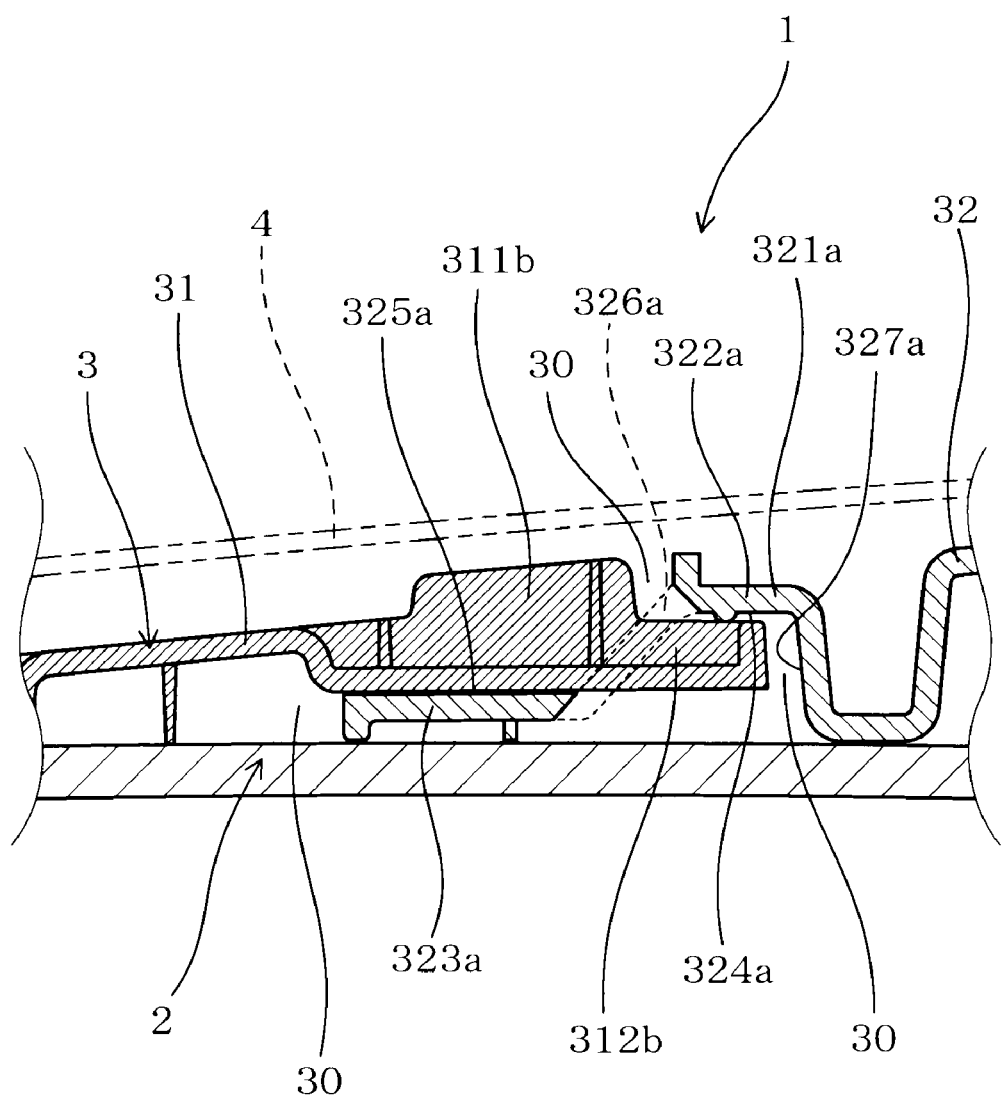
FIG. 3 is a cross-sectional view along A1-A1 of FIG. 2.
Figure 6:
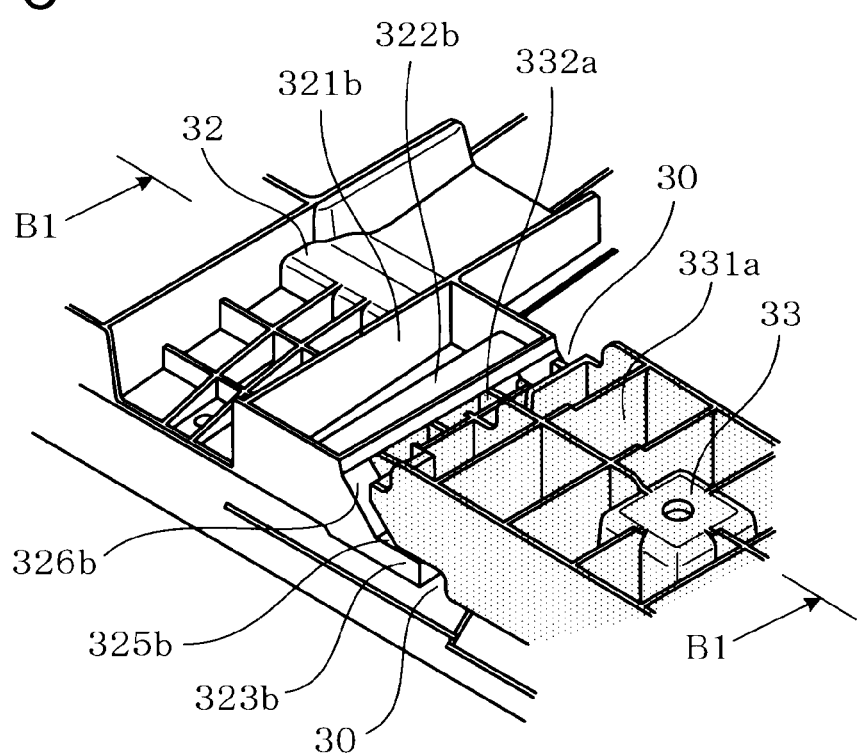
FIG. 6 is an enlarged perspective view of part B of FIG. 1.
Figure 7:
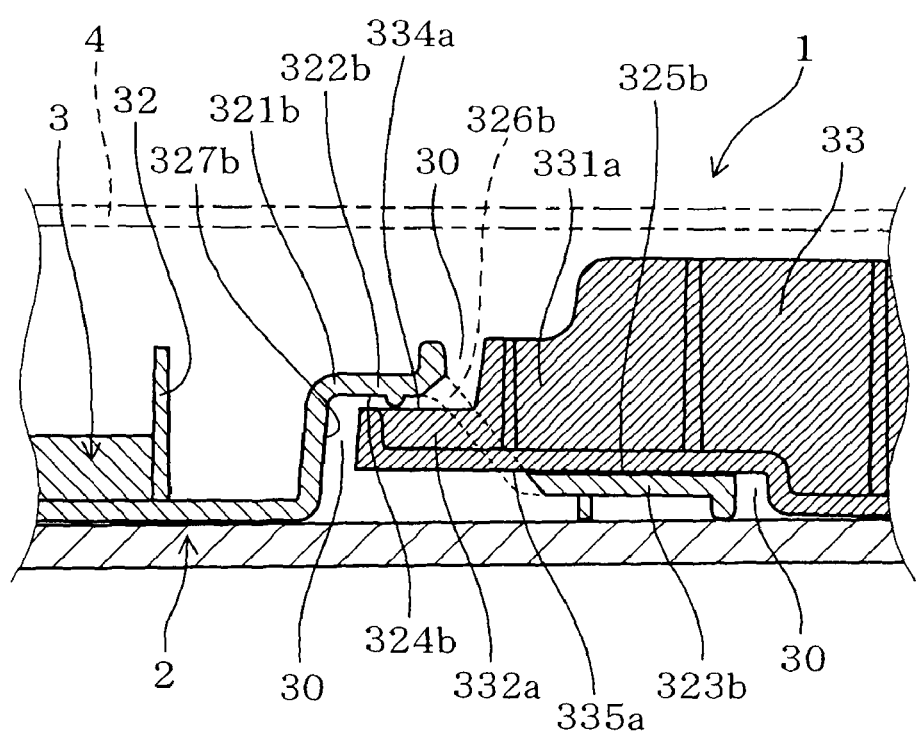
FIG. 7 is a cross-sectional view along B1-B1 of FIG. 6.

As shown in FIGS. 2 and 3, the first segmented rib 31 and second segmented rib 32 fit with each other with gaps 30 therebetween in the longitudinal direction. Also, as shown in FIGS. 6 and 7, the second segmented rib 32 and the third segmented rib 33 fit with each other with gaps 30 therebetween in the longitudinal direction.

In this embodiment, the ceiling member 2 is formed of a mixture of thermoplastic resin and wood fiber. Further, in the reinforcing rib 3, the first segmented rib 31 and third segmented rib 33 are attached to portions where the ceiling member 2 is particularly desired to have enhanced rigidity, and therefore formed of an ABS resin having high rigidity. The second segmented rib 32 is attached to a portion where impact absorption is particularly necessary and therefore formed of a PP resin having a relatively low rigidity.

The first segmented rib 31, second segmented rib 32, and third segmented rib 33 forming the reinforcing rib 3 are formed of materials having different coefficients of thermal expansion from that of the ceiling member 2.

Next, the fitted state of the first segmented rib 31 and second segmented rib 32 will be described.

Figure 4:
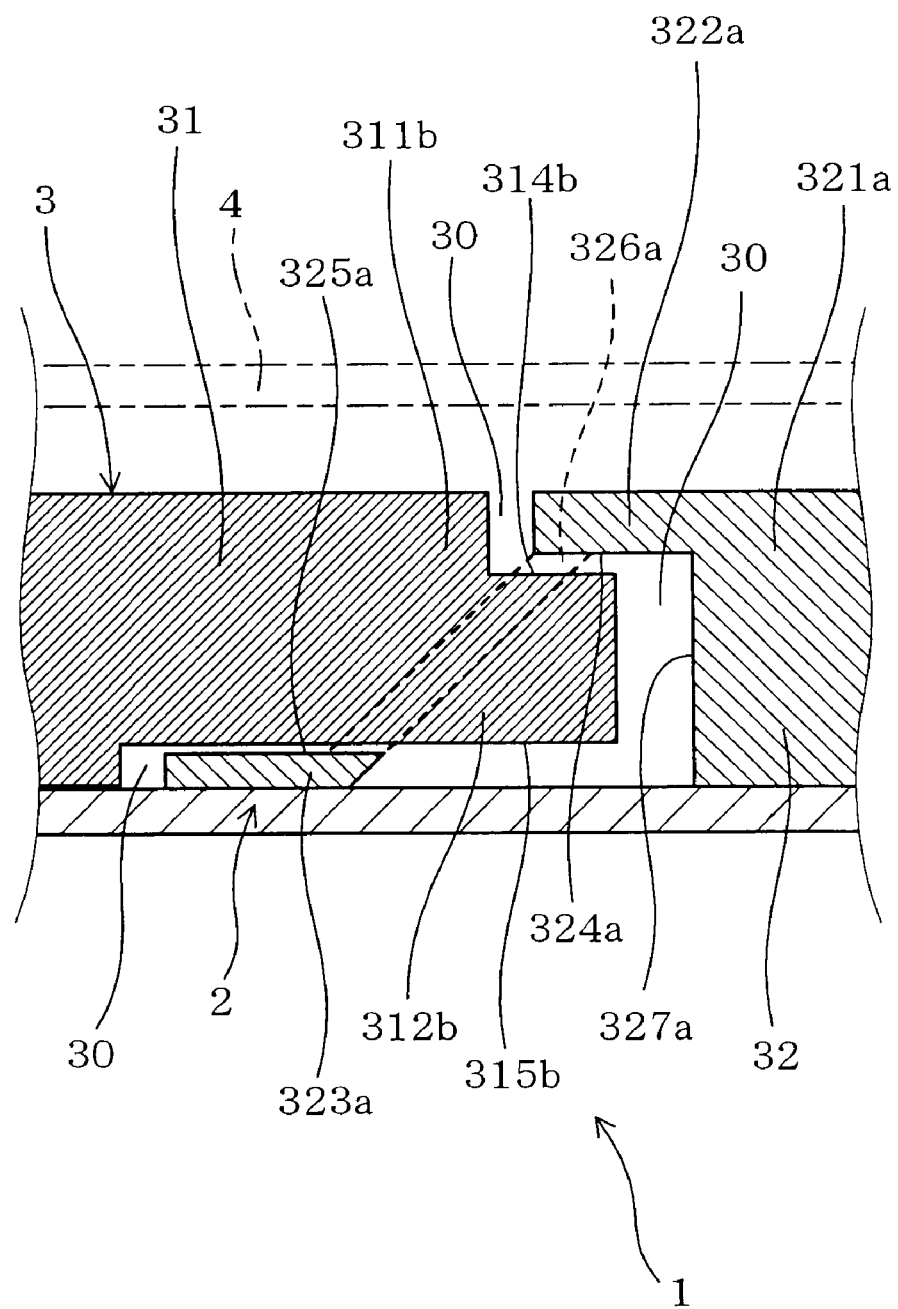
FIG. 4 is an explanatory diagram showing a simplified view of the fitted state of a first segmented rib and a second segmented rib of FIG. 3.

As shown in FIGS. 2 to 4, the first segmented rib 31 is provided, at a rear end portion 311b thereof, with a rear protrusion 312b protruding in a backward direction. The second segmented rib 32 is provided, on an upper side of a front end portion 321a thereof, with an upper front protrusion 322a protruding in a forward direction, and on a lower side thereof, with a lower front protrusion 323a protruding in the forward direction. The lower front protrusion 323a has its tip positioned to protrude more in the longitudinal direction than that of the upper front protrusion 322a.

As shown in the same drawings, the upper front protrusion 322a and lower front protrusion 323a are coupled to each other by front coupling portions 326a provided on both sides of the front end portion 321a of the second segmented rib 32. Between the upper front protrusion 322a and lower front protrusion 323a is formed a front fitting portion 327a for allowing the rear protrusion 312b of the first segmented rib 31 to fit therewith.

As shown in the same drawings, the first segmented rib 31 and second segmented rib 32 are secured together by making the rear protrusion 312b of the first segmented rib 31 fit with the front fitting portion 327a of the second segmented rib 32. A lower face 324a of the upper front protrusion 322a of the second segmented rib 32 faces an upper face 314b of the rear protrusion 312b of the first segmented rib 31 in the up and down direction. An upper face 325a of the lower front protrusion 323a of the second segmented rib 32 faces a lower face 315b of the rear protrusion 312b of the first segmented rib 31 in the up and down direction.

Namely, as shown in the same drawings, the first segmented rib 31 is fitted in such a state that the rear protrusion 312b thereof is restricted in the up and down direction by the lower face 324a of the upper front protrusion 322a and the upper face 325a of the lower front protrusion 323a of the second segmented rib 32. Further, the first segmented rib 31 is fitted in such a state that the rear protrusion 312b thereof is restricted in the left and right direction by the front coupling portions 326a of the second segmented rib 32.

FIG. 2 is an enlarged perspective view of part A of FIG. 1. FIG. 3 is a cross-sectional view along A1-A1 of FIG. 2. FIG. 4 is a diagram showing a simplified view of FIG. 3.

Next, the fitted state of the second segmented rib 32 and third segmented rib 33 will be described.

As shown in FIGS. 6 and 7, the third segmented rib 33 is provided, at a front end portion 331a thereof, with a front protrusion 332a protruding in the forward direction. The second segmented rib 32 is provided, on an upper side of a rear end portion 321b thereof, with an upper rear protrusion 322b protruding in the backward direction, and on a lower side thereof, with a lower rear protrusion 323b protruding in the backward direction. The lower rear protrusion 323b has its tip positioned to protrude more in the longitudinal direction than that of the upper rear protrusion 322b.

As shown in the same drawings, the upper rear protrusion 322b and lower rear protrusion 323b are coupled to each other by rear coupling portions 326b provided on both sides of the rear end portion 321b of the second segmented rib 32. Between the upper rear protrusion 322b and lower rear protrusion 323b is formed a rear fitting portion 327b for allowing the front protrusion 332a of the third segmented rib 33 to fit therewith.

As shown in the same drawings, the second segmented rib 32 and third segmented rib 33 are secured together by making the front protrusion 332a of the third segmented rib 33 fit with the rear fitting portion 327b of the second segmented rib 32. A lower face 324b of the upper rear protrusion 322b of the second segmented rib 32 faces an upper face 334a of the front protrusion 332a of the third segmented rib 33 in the up and down direction. An upper face 325b of the lower rear protrusion 323b of the second segmented rib 32 faces a lower face 335a of the front protrusion 332a of the third segmented rib 33 in the up and down direction.

Namely, as shown in the same drawings, the third segmented rib 33 is fitted in such a state that the front protrusion 332a thereof is restricted in the up and down direction by the lower face 324b of the upper rear protrusion 322b and the upper face 325b of the lower rear protrusion 323b of the second segmented rib 32. Further, the third segmented rib 33 is fitted in such a state that the front protrusion 332a thereof is restricted in the left and right direction by the rear coupling portions 326b of the second segmented rib 32.

FIG. 6 is an enlarged perspective view of part B of FIG. 1. FIG. 7 is a cross-sectional view along B1-B1 of FIG. 6.

Next, steps of attaching the reinforcing rib 3 to the ceiling member 2 will be described.

Figure 5A:
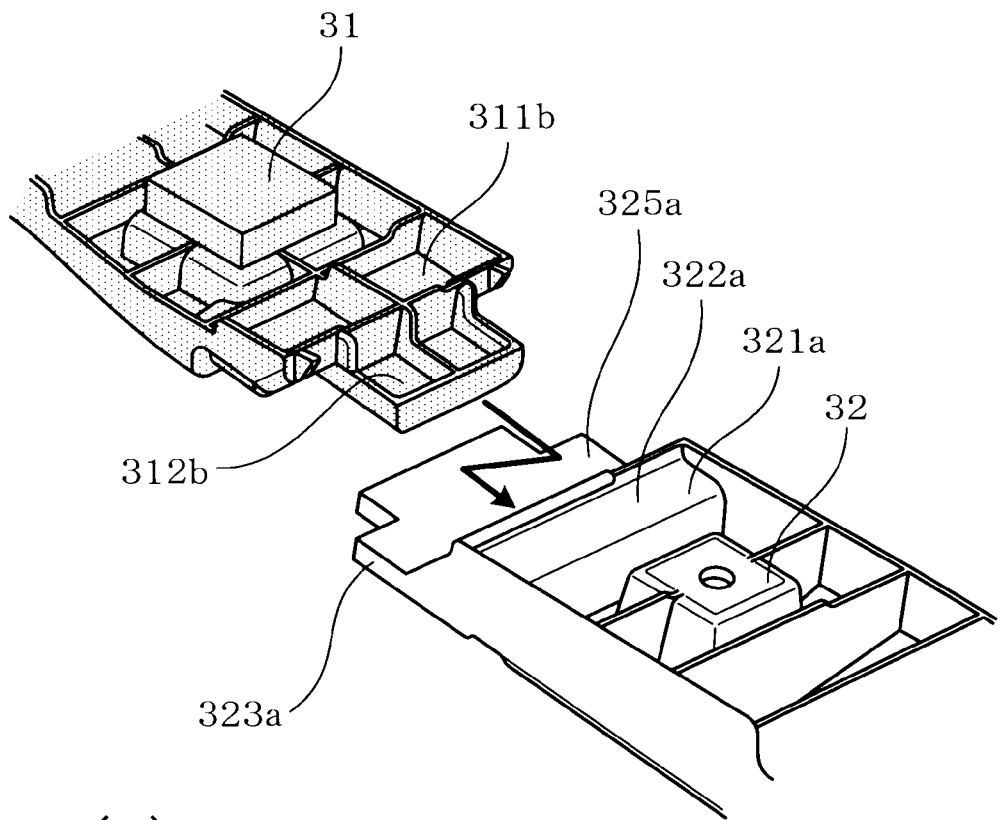
FIGS. 5A and 5B are explanatory diagrams showing a state immediately before the first segmented rib and the second segmented rib are fitted with each other in the embodiment.
Figure 5B:
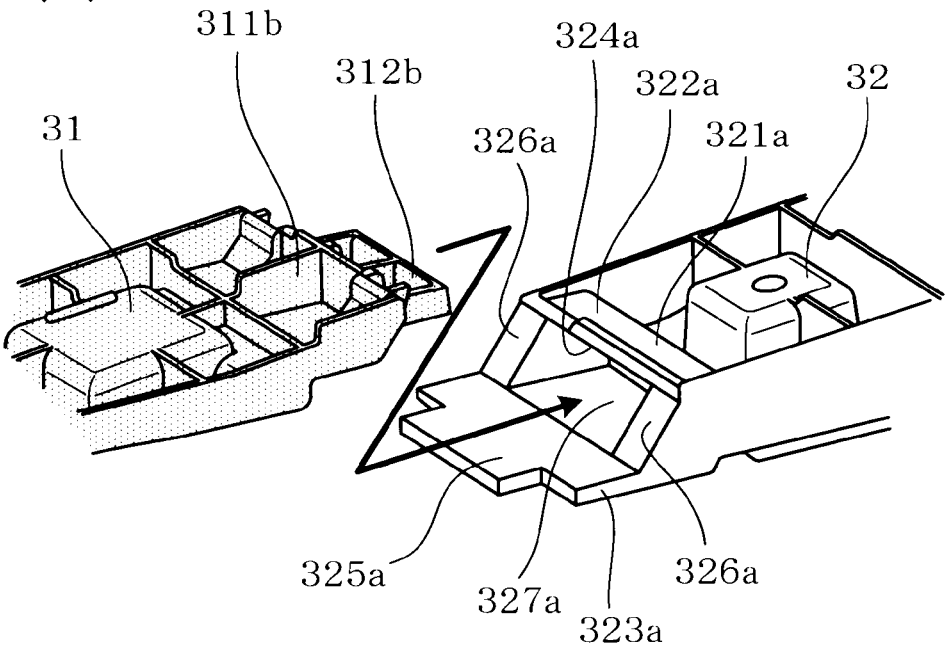

First, as shown in FIGS. 5(a) and 5(b), the rear protrusion 312b of the first segmented rib 31 is inserted and fitted backward into the front fitting portion 327a of the second segmented rib 32 so as to assemble the first segmented rib 31 with the second segmented rib 32.

Figure 8A:
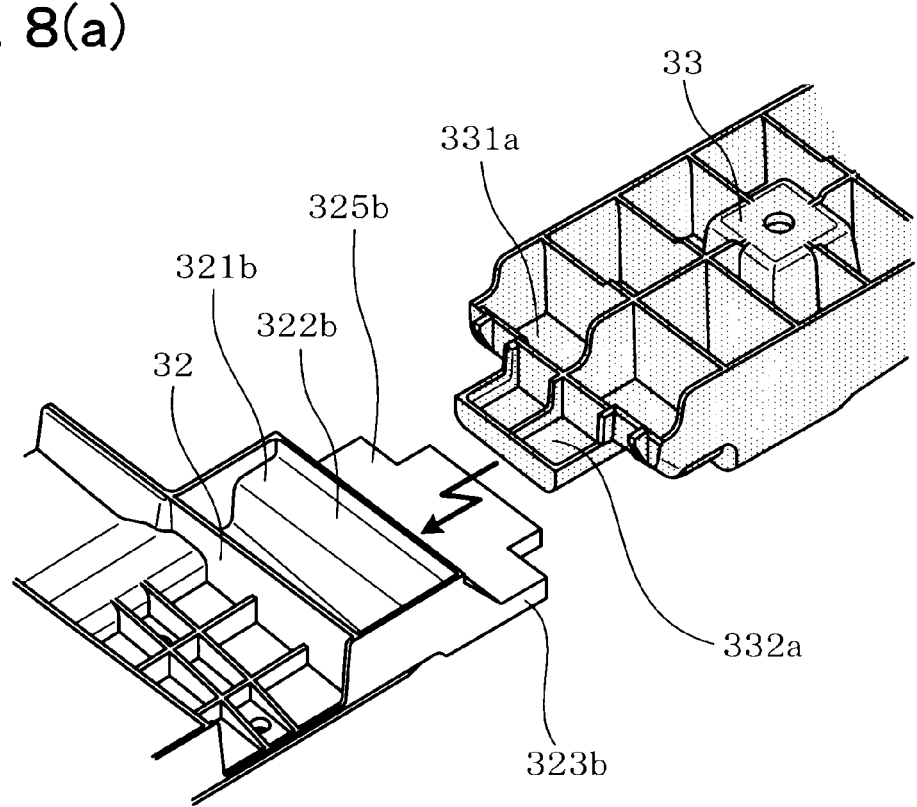
FIGS. 8A and 8B are explanatory diagrams showing a state immediately before the second segmented rib and a third segmented rib are fitted with each other in the embodiment.
Figure 8B:
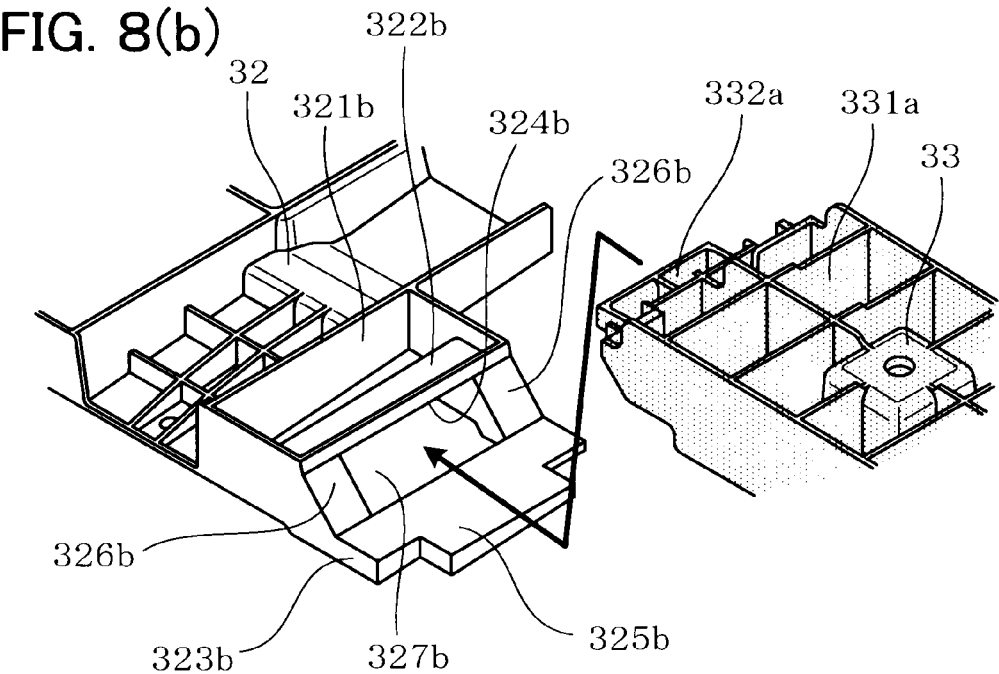

Then, as shown in FIGS. 8(a) and 8(b), the front protrusion 332a of the third segmented rib 33 is inserted and fitted forward into the rear fitting portion 327b of the second segmented rib 32 so as to assemble the second segmented rib 32 with the third segmented rib 33.

Thus the first segmented rib 31, second segmented rib 32, and third segmented rib 33 are assembled together to obtain the reinforcing rib 3.

Next, hot melt adhesive in a molten state is applied to a location on the ceiling member 2 where the reinforcing rib 3 is to be attached. For the hot melt adhesive in this embodiment, a polyamide hot melt adhesive was used.

After setting the reinforcing rib 3 on the hot melt adhesive, the hot melt adhesive is cooled and cured to bond the reinforcing rib 3.

The reinforcing rib 3 is thus attached to the ceiling member 2.

Further, after that, the ceiling member 2, with the reinforcing rib 3 attached thereto, is secured to a body member 4 (see FIGS. 3, 4 and 7) forming the vehicle body, together with assist grips, a room lamp, sun visors and the like respectively provided at assist grip fixing portions 71, a room lamp fixing portion 72, and sun visor fixing portions 73 and the like (see FIG. 1).

Next, the effects achieved by the vehicle ceiling structure 1 of this embodiment will be described.

In the vehicle ceiling structure 1 of this embodiment, the reinforcing rib 3 is not formed in one piece but comprises a plurality of segmented ribs 31 to 33 divided by gaps 30 in the longitudinal direction. Therefore, after the reinforcing rib 3 is attached to the ceiling member 2 and when they undergo thermal expansion and contraction due to temperature changes thereof, the difference in the amount of expansion and contraction caused by the difference in their respective coefficients of thermal expansion can be made smaller. Namely, since thermal expansion and contraction occur respectively in each of the plurality of segmented ribs 31 to 33 that are divided of the reinforcing rib 3, the difference in the amount of expansion and contraction between the reinforcing rib 3 and the ceiling member 2 can be made smaller. Thereby, formation of wrinkles in the ceiling member 2 after the attachment of the reinforcing rib 3 can be prevented.

Moreover, in this embodiment, as shown in FIG. 4, and as will be explained taking the first segmented rib 31 and second segmented rib 32 adjacent to each other as one example and using the simplified view (simplified view of FIG. 3) of how they fit with each other, the first segmented rib 31 and second segmented rib 32 fit with each other such that the lower face 324a of the upper front protrusion 322a and the upper face 325a of the lower front protrusion 323a of the second segmented rib 32 respectively face the rear end portion 312b of the first segmented rib 31 in the up and down direction. Namely, the second segmented rib 32 has the lower face 324a of the upper front protrusion 322a and the upper face 325a of the lower front protrusion 323a in upper and lower parts of its front end portion 321a to act as abutting faces relative to the first segmented rib 31, so that the rear end portion 312b of the first segmented rib 31 faces these abutting faces in the up and down direction.

Accordingly, the first segmented rib 31 and second segmented rib 32 fit with each other in a state in which the first segmented rib 31 is restricted relative to the second segmented rib 32 sufficiently in the up and down direction. Thereby, during the handling when assembling the ceiling member 2 to the vehicle body after attaching the reinforcing rib 3 to the ceiling member 2, even if the first segmented rib 31 and second segmented rib 32 are subjected to stress in the portion between them (segmented portion), flexing or bending of the ceiling member 2 can be prevented from occurring. The same applies to the portion between the second segmented rib 32 and third segmented rib 33.

Accordingly, in the vehicle ceiling structure 1 of this embodiment, the problems associated with the difference in the coefficient of thermal expansion between the ceiling member 2 and reinforcing rib 3 can be prevented by forming the reinforcing rib 3 with a plurality of segmented ribs 31 to 33. And, the problem that may occur by forming the reinforcing rib 3 with a plurality of segmented ribs 31 to 33 can be prevented by the fitting structure between adjacent segmented ribs 31 to 33.

In this embodiment, the first segmented rib 31 and second segmented rib 32 adjacent to each other are fitted with each other such that they are not twisted in a rotating direction around an axis extending in the longitudinal direction. Namely, the first segmented rib 31 is fitted in such a state that its rear protrusion 312b is restricted relative to the second segmented rib 32 in the up and down direction as well as in the left and right direction. Thus the first segmented rib 31 and second segmented rib 32 adjacent to each other can be sufficiently and reliably fitted with each other.

Similarly, the second segmented rib 32 and third segmented rib 33 adjacent to each other are fitted with each other such that they are not twisted in a rotating direction around an axis extending in the longitudinal direction. Namely, the third segmented rib 33 is fitted in such a state that its front protrusion 332a is restricted relative to the second segmented rib 32 in the up and down direction as well as in the left and right direction. Thus the second segmented rib 32 and third segmented rib 33 adjacent to each other can be sufficiently and reliably fitted with each other.

Further, the lower front protrusion 323a of the second segmented rib 32 has its tip positioned to protrude more in the longitudinal direction than that of the upper front protrusion 322a. Therefore, as shown in FIGS. 5(a) and 5(b), the rear protrusion 312b of the first segmented rib 31 can be readily inserted and fitted diagonally from above into the front fitting portion 327a of the second segmented rib 32.

Also, the lower rear protrusion 323b of the second segmented rib 32 has its tip positioned to protrude more in the longitudinal direction than that of the upper rear protrusion 322b. Therefore, as shown in FIGS. 8(a) and 8(b), the front protrusion 332a of the third segmented rib 33 can be readily inserted and fitted diagonally from above into the rear fitting portion 327b of the second segmented rib 32.

Further, the ceiling member 2 has an opening 20 for the sunroof. That is, the ceiling member 2 provided with the opening 20 for the sunroof has a lower rigidity than normal ceiling members 2. Therefore, attaching the reinforcing rib 3 to the ceiling member 2 by adopting the vehicle ceiling structure 1 of this embodiment enables to secure a sufficient rigidity of the ceiling member 2.

The ceiling member 2 and reinforcing rib 3 are bonded together with a hot melt adhesive. Therefore, the reinforcing rib 3 can be readily and reliably attached to the ceiling member 2.

Further, part of the reinforcing rib 3 serves also as an impact absorbing material. In this embodiment, the second segmented rib 32 corresponds to this part. Therefore, the second segmented rib 32 not only serves its function as a reinforcing member for enhancing the rigidity of the ceiling member 2, but also serves a function as an impact absorbing material for absorbing an impact by deforming and/or breaking by an impact load applied when, for example, a head portion of a passenger inside the vehicle hits the ceiling member 2.

Further, in the reinforcing rib 3, the second segmented rib 32 is made of a different resin from that of the first segmented rib 31 and third segmented rib 33. Namely, dividing up the reinforcing rib 3 into a plurality of segmented ribs 31 to 33 has made it possible to use different types of resins depending on the attaching locations and necessary performance properties or the like of the segmented ribs 31 to 33 to deal with various configurations.

In this embodiment, a high-rigidity resin (ABS resin) is used for the first segmented rib 31 and third segmented rib 33 that are attached to portions where the ceiling member 2 is particularly desired to have enhanced rigidity, while a resin easily deformable and/or breakable and having a relatively low rigidity (PP resin) is used for the second segmented rib 32 that is attached to a portion where impact absorption is particularly necessary.

Using different resins for forming respective segmented ribs 31 to 33 and bonding them using a hot melt adhesive as in this embodiment will necessitate a change of adhesives respectively for the segmented ribs 31 to 33. However, by adopting the vehicle ceiling structure 1 of this embodiment, it is possible to use only one type of adhesive.

Namely, even if there is a segmented rib (for example, second segmented rib 32) made of a resin that has somewhat lower compatibility with the hot melt adhesive used, other segmented ribs (for example, first segmented rib 31 and third segmented rib 33) made of a resin having good compatibility with the adhesive used and arranged on both sides can provide an anchoring effect due to the fitting structure between adjacent segmented ribs 31 to 33, whereby the reinforcing rib 3 can be bonded to the ceiling member 2 sufficiently. Thereby, a situation where two types of adhesives would have been required conventionally can be dealt with using only one type of adhesive.

As described above, according to this embodiment, a vehicle ceiling structure 1 that can prevent occurrence of failures such as wrinkles, flexing, bending or the like of the ceiling member 2 can be provided.

The invention claimed is:

1. A vehicle ceiling structure having a long reinforcing rib attached to a ceiling member of the vehicle, the rib being made of a resin having a different coefficient of thermal expansion from that of the ceiling member, wherein the reinforcing rib comprises a plurality of segmented ribs that are divided by a gap in a longitudinal direction;

one of the segmented ribs adjacent to an other segmented rib is formed, in upper and lower parts of an end portion thereof, with an upper protrusion and a lower protrusion protruding in the longitudinal direction;

the one segmented rib and the other segmented rib fit with each other such that a lower face of the upper protrusion and an upper face of the lower protrusion of the one segmented rib respectively face an end portion of the other segmented rib in an up and down direction; and the lower protrusion of the one segmented rib has its tip positioned to protrude more in the longitudinal direction than that of the upper protrusion.

2. The vehicle ceiling structure according to claim 1, wherein the ceiling member has an opening for a sunroof.

3. The vehicle ceiling structure according to claim 1, wherein the ceiling member and the reinforcing rib are bonded together with a hot melt adhesive.

4. The vehicle ceiling structure according to claim 1, wherein at least part of the reinforcing rib serves also as an impact absorbing material.

5. The vehicle ceiling structure according to claim 1, wherein at least one of the plurality of segmented ribs is made of a different resin from that of the other segmented ribs.

* * * * *